(12) United States Patent
Ma et al.

(10) Patent No.: US 9,906,351 B2
(45) Date of Patent: Feb. 27, 2018

(54) METHOD OF COMMUNICATION WITH DISTRIBUTED ANTENNA ARRAY SYSTEM AND ARRAY SYSTEM

(71) Applicant: Huawei Technologies Co., Ltd., Shenzhen (CN)

(72) Inventors: Ni Ma, Shanghai (CN); Jianping Zhao, Shanghai (CN); Jing Yang, Shanghai (CN); Tao Liu, Xi'an (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 65 days.

(21) Appl. No.: 14/683,868

(22) Filed: Apr. 10, 2015

(65) Prior Publication Data

US 2015/0215104 A1 Jul. 30, 2015

Related U.S. Application Data

(63) Continuation of application No. PCT/CN2012/082720, filed on Oct. 10, 2012.

(51) Int. Cl.
*H04L 5/00* (2006.01)
*H04B 7/04* (2017.01)
(Continued)

(52) U.S. Cl.
CPC .......... *H04L 5/0073* (2013.01); *H04B 7/022* (2013.01); *H04B 7/04* (2013.01); *H04W 72/046* (2013.01);
(Continued)

(58) Field of Classification Search
CPC ......... H04L 5/0073; H04B 7/022; H04B 7/04; H04W 72/0453; H04W 72/046; H04W 88/085
See application file for complete search history.

(56) References Cited

U.S. PATENT DOCUMENTS

2003/0189515 A1* 10/2003 Jacomb-Hood ........ H01Q 1/288
342/373
2004/0157645 A1* 8/2004 Smith .................... H01Q 1/246
455/562.1
(Continued)

FOREIGN PATENT DOCUMENTS

CN 102340783 A 2/2012
CN 102450048 A 5/2012
(Continued)

*Primary Examiner* — Mehmood B Khan
(74) *Attorney, Agent, or Firm* — Slater Matsil, LLP (57) ABSTRACT

Embodiments of the present invention provide a method for communication through a distributed antenna array system and an array system. The antenna array system includes a number of antenna units, a baseband resource pool, a radio frequency resource pool, and a controller. The controller is configured to monitor a signal state of a user equipment under a coverage area of a macrocell, to determine an antenna unit that provides a service to the user equipment, and, according to a capability of the user equipment, determine whether to perform coordinated transmission of a plurality of antennas and a corresponding transmission mode for the user equipment, and then to configure an antenna resource for the user equipment, so that the baseband resource pool and the radio frequency resource pool control the configured antenna resource to provide a communication service for the user equipment.

20 Claims, 3 Drawing Sheets

```
A controller monitors a signal state of a user equipment under the          601
coverage area of the base station, and determines an antenna unit
used to provide a service for the user equipment
                                ↓
The controller determines whether the user equipment requires
coordinated transmission of a plurality of antennas according to an         602
antenna capability of the user equipment and a coverage area of each
antenna unit
                                ↓
The controller configures an antenna resource for the user equipment,       603
and sends information about the configured antenna resource to a
baseband resource pool
                                ↓
The baseband resource pool maps the configured antenna resource to          604
a physical port of a corresponding radio frequency resource pool
according to the configured antenna resource
                                ↓
The radio frequency resource pool controls, according to the mapped         605
physical port, an antenna unit corresponding to the physical port to
provide a communication service for the user equipment
```

(51) Int. Cl.
    *H04W 72/04*    (2009.01)
    *H04B 7/022*    (2017.01)
    *H04W 88/08*    (2009.01)

(52) U.S. Cl.
    CPC ...... *H04W 72/0453* (2013.01); *H04W 88/085* (2013.01)

(56) References Cited

U.S. PATENT DOCUMENTS

| | | | |
|---|---|---|---|
| 2011/0038308 A1* | 2/2011 | Song | H04B 7/0408 370/328 |
| 2011/0065448 A1* | 3/2011 | Song | H04B 7/0632 455/452.2 |
| 2011/0215985 A1* | 9/2011 | Kaplan | H01Q 21/08 343/879 |
| 2012/0026955 A1 | 2/2012 | Benjebbour et al. | |
| 2012/0142395 A1 | 6/2012 | Yamazaki | |
| 2012/0327800 A1* | 12/2012 | Kim | H04W 72/082 370/252 |
| 2013/0142054 A1* | 6/2013 | Ahmadi | H04B 7/024 370/252 |
| 2013/0273854 A1 | 10/2013 | Zhang et al. | |
| 2015/0116173 A1 | 4/2015 | Zhang et al. | |
| 2016/0190707 A1* | 6/2016 | Park | H01Q 1/246 370/334 |
| 2017/0019862 A1* | 1/2017 | Goransson | H04B 7/0617 |

FOREIGN PATENT DOCUMENTS

| | | | |
|---|---|---|---|
| CN | 102545989 A * | 7/2012 | ............ H04W 24/10 |
| CN | 102545989 A * | 7/2012 | ............ H04W 24/02 |
| CN | 102685864 A | 9/2012 | |
| EP | 2363918 A1 | 9/2011 | |
| EP | 2642670 A1 | 9/2013 | |
| JP | 2012029181 A | 2/2012 | |
| WO | 2010055749 A1 | 5/2010 | |
| WO | 2012100856 A1 | 8/2012 | |
| WO | 2012124715 A1 | 9/2012 | |

* cited by examiner

METHOD OF COMMUNICATION WITH DISTRIBUTED ANTENNA ARRAY SYSTEM AND ARRAY SYSTEM

This application is a continuation of International Application No. PCT/CN2012/082720, filed on Oct. 10, 2012, which is hereby incorporated by reference in its entirety.

TECHNICAL FIELD

The present invention relates to the field of radio communications, and in particular, to a method for communication through a distributed antenna array system and an array system.

BACKGROUND

With the rapid development of radio communications technologies and relevant services, people have a higher demand for reliable and continuous high speed wireless broadband services. Based on the existing estimation, in the future ten years, people's demand for wireless capacity might increase by tens or even hundreds of times as compared to nowadays.

To meet such a challenge, a series of new architectures are put forward, aiming to significantly increase the capacity and coverage of wireless networks. Currently, the most widely used technologies, such as the heterogeneous network, distributed antenna system, and high order cell split, have significantly increased the capacity and coverage of the wireless networks.

In the heterogeneous network technology, several small cells are deployed within the coverage area of a macrocell to increase the capacity and coverage of a wireless network. In the high order cell split technology, an antenna of an original cell is split to enhance coverage and capacity. The distributed antenna system technology is a network formed of a plurality of antennas used for providing indoor wireless coverage and distributed within a building, and sub-antenna units need to be deployed at remote ends of a central station and are connected through optical fibers.

However, in both the heterogeneous network technology and the distributed antenna system technology in the prior art, the location of a small cell or a sub-antenna unit needs to be selected during planning, which makes engineering implementation troublesome. Also, optical fiber connection between a small cell and a macrocell is required on a large scale, and optical fiber connection between a central station and each sub-antenna unit is also required on a large scale, which results in a high engineering cost.

In the high order cell split technology in the prior art, because the increase of capacity depends on the number of cells that can be split, theoretically the capacity is higher when more cells can be split; however, cell split brings interference between split cells, which prevents a significant increase of the capacity of a wireless network.

SUMMARY

Embodiments of the present invention provide a distributed antenna array system and a method for communication through a distributed antenna array system, which can reduce a deployment cost of distributed antennas, and at the same time increase signal quality and reduce interference, and further improve user experience and increase network capacity.

To achieve the foregoing objective, embodiments of the present invention adopt the following technical solutions.

In a first aspect, an embodiment of the present invention provides a distributed antenna array system. The antenna array system includes a plurality of antenna units, a radio frequency resource pool, a baseband resource pool, and a controller. The plurality of antenna units is connected to the radio frequency resource pool. The radio frequency resource pool is further connected to the baseband resource pool. The baseband resource pool is further connected to the controller. The plurality of antenna units includes a macrocell antenna and a plurality of auxiliary antennas. The macrocell antenna is disposed on a macrocell, and the plurality of auxiliary antennas is distributed at positions allowing coordination with an antenna unit within a coverage area of the macrocell.

The controller is configured to: according to a signal state of a user equipment under the coverage area of the macrocell, determine an antenna unit used to provide a service for the user equipment, according to a reception and transmission capability of the user equipment, determine whether to perform coordinated transmission of a plurality of antennas and a corresponding transmission mode for the user equipment, and then send information about an antenna resource configured for the user equipment to the baseband resource pool, so that the baseband resource pool and the radio frequency resource pool control the configured antenna resource to provide a communication service for the user equipment.

The baseband resource pool and the radio frequency resource pool are configured to: according to the information about the configured antenna resource sent by the controller, control a corresponding antenna unit to provide a communication service for the user equipment.

In a first possible implementation manner, according to the first aspect, the signal state of the user equipment is path loss from the user equipment to an antenna unit covering the user equipment; or the signal state of the user equipment is downlink receive power of the user equipment; or the signal state of the user equipment is receive power for the antenna unit to receive an uplink signal sent by the user equipment.

In a second possible implementation manner, with reference to the first possible implementation manner, the auxiliary antenna is a low profile antenna or an antenna with a large electrical downtilt at the near site area.

In a third possible implementation manner, with reference to the first possible implementation manner, the auxiliary antenna is a single or dual polarized antenna.

In a fourth possible implementation manner, with reference to the first aspect or the first possible implementation manner to the third possible implementation manner, the radio frequency resource pool 12 includes a low power radio frequency resource pool 121 and a high power radio frequency resource pool 122.

In a fifth possible implementation manner, with reference to the fourth possible implementation manner, the auxiliary antennas are disposed within 100 meters around the macrocell.

In a second aspect, an embodiment of the present invention further provides a method for communication through a distributed antenna array system, including: determining, by a controller, according to a signal state of a user equipment under a coverage area of a macrocell, an antenna unit used to provide a service for the user equipment; determining, by the controller, according to a reception and transmission capability of the user equipment, whether the user equipment requires coordinated transmission of a plurality of antennas and a corresponding transmission mode; configuring, by the controller, an antenna resource for the user equipment, and sending information about the configured antenna resource to a baseband resource pool; mapping, by the baseband resource pool, the configured antenna resource to a physical port of a corresponding radio frequency resource pool according to the configured antenna resource; and controlling, by the radio frequency resource pool, according to the mapped physical port, an antenna unit corresponding to the physical port to provide a communication service for the user equipment.

In a first possible implementation manner, according to the second aspect, the antenna unit includes a macrocell antenna and a plurality of auxiliary antennas. The plurality of auxiliary antennas is distributed at positions allowing coordination with an antenna unit within the coverage area of the macrocell.

In a second possible implementation manner, with reference to the second aspect or the first possible implementation manner, the signal state of the user equipment is path loss from the user equipment to an antenna unit covering the user equipment; or the signal state of the user equipment is downlink receive power of the user equipment; or the signal state of the user equipment is receive power for the antenna unit to receive an uplink signal sent by the user equipment.

In a third possible implementation manner, with reference to the second possible implementation manner, the auxiliary antenna is a low profile antenna or an antenna with a large electrical downtilt at the near site area.

In a fourth possible implementation manner, with reference to the second possible implementation manner, the auxiliary antenna is a single or dual polarized antenna.

In a fifth possible implementation manner, with reference to the second aspect or the first possible implementation manner to the fourth possible implementation manner, the radio frequency resource pool includes a low power radio frequency resource pool and a high power radio frequency resource pool.

In the foregoing distributed antenna array system, as auxiliary antennas are disposed at positions allowing coordination with an antenna unit under a coverage area of a macrocell, the auxiliary antennas are close to the macrocell, and large-scale optical fiber connection is not required, thereby lowering a deployment cost of a distributed antenna array system. At the same time, as the auxiliary antennas are disposed at the positions allowing coordination with the antenna unit under the coverage area of the macrocell, a user equipment within a range of the macrocell can obtain a coordinated transmission service of a plurality of antennas, thereby increasing signal quality and reducing interference, and further improving user experience and increasing network capacity.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
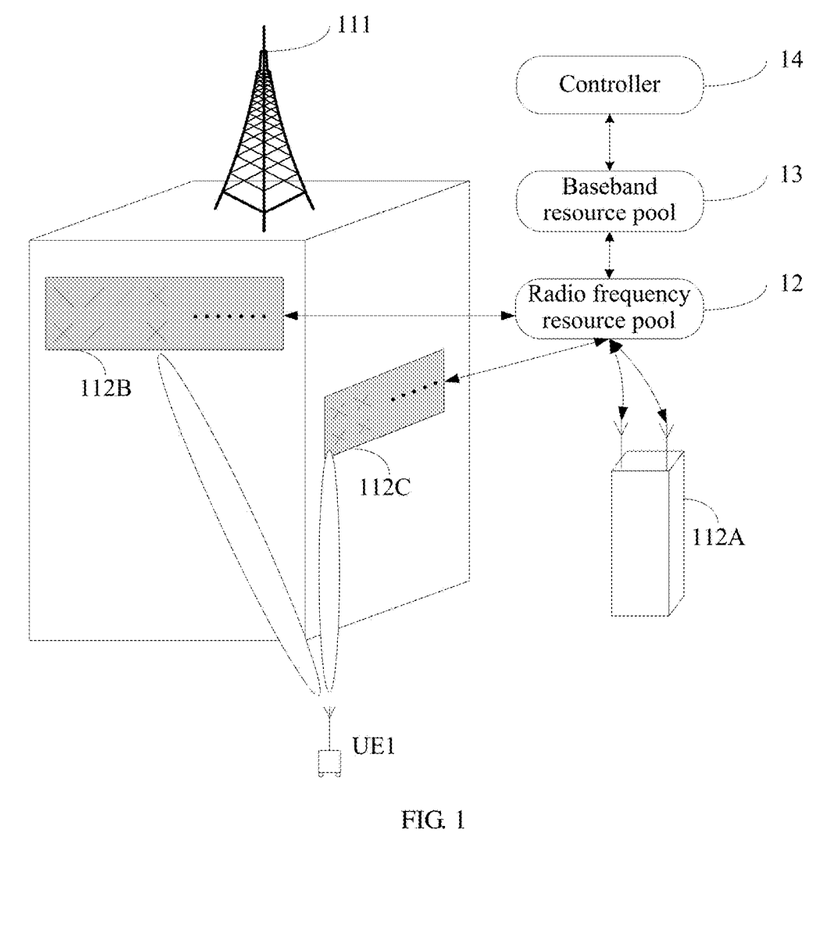
FIG. 1 is a schematic diagram of a distributed antenna array system provided in an embodiment of the present invention.

An embodiment of the present invention provides a distributed antenna array system. As shown in FIG. 1, the antenna array system includes a plurality of antenna units, a radio frequency resource pool 12, a baseband resource pool 13, and a controller 14. The plurality of antenna units is connected to the radio frequency resource pool 12, respectively. The radio frequency resource pool 12 is further connected to the baseband resource pool 13. The baseband resource pool 13 is further connected to the controller 14. The plurality of antenna units is 111, 112A, 112B, and 112C, among which the antenna unit 111 is the macrocell antenna, and the antenna units 112A, 112B, and 112C are the auxiliary antennas.

The plurality of antenna units may be connected to the radio frequency resource pool 12 by adopting a feeder, respectively. Specifically, the auxiliary antenna can adopt a low profile antenna, specifically. For details, reference may be made to the antennas 112B and 112C shown in FIG. 1. Certainly, the auxiliary antenna specifically may also be a single or dual or multi polarized antenna. For details, reference may be made to the antenna 112A shown in FIG. 1.

As the auxiliary antenna adopted in the embodiment of the present invention may be a low profile antenna, for example, 112B and 112C, and the thickness of the antenna may be smaller than 40 mm. In this case, the profile thickness, volume, and weight of the antenna units 112B and 112C may be significantly reduced, which facilitates wall-mounting and concealed installation, making location selection easy at the time of planning an antenna position, and the antenna units may be directly fixed on a building according to an actual requirement, not requiring additional space, making the engineering implementation easy.

Further, the auxiliary antennas may further be antennas with a large electrical downtilt at the near site area and being array elements arranged at an unequal pitch, which are configured to guarantee the coverage in the vertical dimension and configured to implement coordination for the near site area of the macrocell antenna.

The macrocell antenna 111 is disposed on a macrocell, and the plurality of auxiliary antennas is distributed at positions allowing coordination with an antenna unit within a coverage area of the macrocell.

The plurality of auxiliary antennas is distributed at positions allowing coordination with an antenna unit under the coverage area of the macrocell, so that if a certain area under the coverage area of the macrocell requires strengthened coverage, coordinated transmission needs to be performed between the auxiliary antennas and the macrocell antenna 111. If the macrocell antenna 111 is far away from the auxiliary antenna, the time that a receiver of the macrocell antenna 111 receives a signal of a user equipment is obviously inconsistent with the time that a receiver of the auxiliary antenna receives a signal of the user equipment. This time difference causes that a delayed antenna signal has different phase rotation on each carrier in the frequency domain. Specifically, the phase rotation amount changes along with the carrier position. If the phase rotation amount is too large, an obvious error occurs on the channel estimation of the user equipment, causing that two antenna units fail to perform coordinated transmission normally.

Certainly, coordinated transmission may also be performed between two auxiliary antennas. As the macrocell antenna 111 is usually located at the center of a macrocell, when it is guaranteed that all auxiliary antennas can perform coordinated transmission with the macrocell antenna 111, the distance between any two auxiliary antennas also meets the requirement of coordinated transmission.

Specifically, the plurality of auxiliary antennas may be specifically distributed within 100 meters around the macrocell or at farther positions.

The controller 14 is configured to determine, according to a signal state of a user equipment under the coverage area of the macrocell, an antenna unit used to provide a service for the user equipment, determine, according to a reception and transmission capability of the user equipment, whether the user equipment requires coordinated transmission of a plurality of antennas and a corresponding transmission mode, and then send information about an antenna resource configured for the user equipment to the baseband resource pool, so that the baseband resource pool 13 and the radio frequency resource pool 12 control the configured antenna resource to provide a communication service for the user equipment.

The baseband resource pool 13 and the radio frequency resource pool 12 control, according to the information about the configured antenna resource sent by the controller 14, a corresponding antenna unit to provide a communication service for the user equipment.

That the controller 14 determines an antenna unit used to provide a service for the user equipment is specifically to determine a physical port or logical port of the antenna unit. The physical port and the logical port of an antenna unit may be different. According to a certain mapping rule, the controller may map a plurality of physical antenna ports into one or more logical transmission ports, and the process is transparent to a terminal. In this manner, after the radio frequency resource pool 12 receives the information about the configured antenna resource sent by the controller 14, the information about the configured antenna resource includes information about an antenna unit used to provide a service for the user equipment and a transmission mode, and then the radio frequency resource pool 12 controls, according to the information about the configured antenna resource, the corresponding antenna unit to provide a service for the user equipment.

Specifically, as shown in FIG. 1, as the plurality of auxiliary antennas is disposed at positions allowing coordination with an antenna unit within the coverage area of the macrocell, respectively, the controller 14 monitors a signal state of a user equipment UE1 under the coverage area of the macrocell. It is assumed that in a linear domain, a base station corresponding to the UE1 has a maximum signal processing capability of 4-antenna transmission, and each of the antenna unit 111 and antenna units 112A to 112C forms a pair of dual polarized antennas. It is assumed that the ascending order of path loss from the UE1 to the antenna units is: 112B, 112C, 112A, and 111. In this case, when the difference between the reciprocal of the path loss from the UE1 to the antenna unit 112B and the sum of the reciprocals of the path loss from the UE1 to the antenna units 112A, 112C, and 111 exceeds a first preset threshold value, it is determined that the antenna unit 112B provides a service to the UE1. As the UE1 has the signal processing capability of 4-antenna transmission, the controller 14 continues to determine accordingly whether the antenna unit 112C may also serve as a serving antenna unit of the UE1. If the controller 14 determines that the antenna unit 112C is a serving antenna unit of the UE1, the controller 14 determines to perform coordinated transmission of antenna units 112B and 112C for the UE1, and at the same time determines a corresponding transmission mode. Then, the controller 14 configures antenna resources of the antenna units 112B and 112C for the UE1, and sends information about the configured antenna resources to the baseband resource pool 13. The information about the configured antenna resources includes information such as antenna ports of antenna units 112B and 112C, or logical ports of antenna units 112B and 112C, and a transmission mode. Then, the baseband resource pool 13 maps the logical ports of the antenna units 112B and 112C to the physical ports of the antenna units 112B and 112C according to the information about the configured antenna resources, that is, maps the logical ports to the physical ports corresponding to the antenna units 112B and 112C in the radio frequency resource pool 12. The radio frequency resource pool controls the antennas 112B and 112C through the corresponding ports to provide a coordination service to the user equipment.

Optionally, in a linear domain, when determining an antenna unit used to provide a service for the user equipment, the controller 14 may further determine, according to receive power for the antenna unit to receive a signal sent by the user equipment, an antenna unit used to provide a service for the user equipment. Within the maximum range of the reception processing capability of the current UE, the receive power of the antenna units is ranked in descending order. If the ratio of the receive power of the antenna unit to the sum of receive power of other antenna units behind the antenna unit exceeds a second preset threshold value, the controller 14 determines that the antenna unit is an antenna unit used to provide a service for the user equipment.

Optionally, in a linear domain, when determining an antenna unit used to provide a service for the user equipment, the controller 14 may further determine, according to downlink receive power of the user equipment, an antenna unit used to provide a service for the user equipment. Within the maximum range of the reception processing capability of the current UE, downlink receive power for the user equipment to receive from a plurality of antenna units is ranked in descending order, if the ratio of downlink receive power for the user equipment to receive from the antenna unit to the sum of receive power for the user equipment to receive from other antenna units exceeds a third preset threshold value, the controller 14 determines that the antenna unit is an antenna unit used to provide a service for the user equipment.

Certainly, in a nonlinear domain, the controller 14 may also determine, according to the signal state of the user equipment, an antenna unit used to provide a service for the user equipment, and details are not repeatedly described in the embodiment of the present invention.

Figure 2:
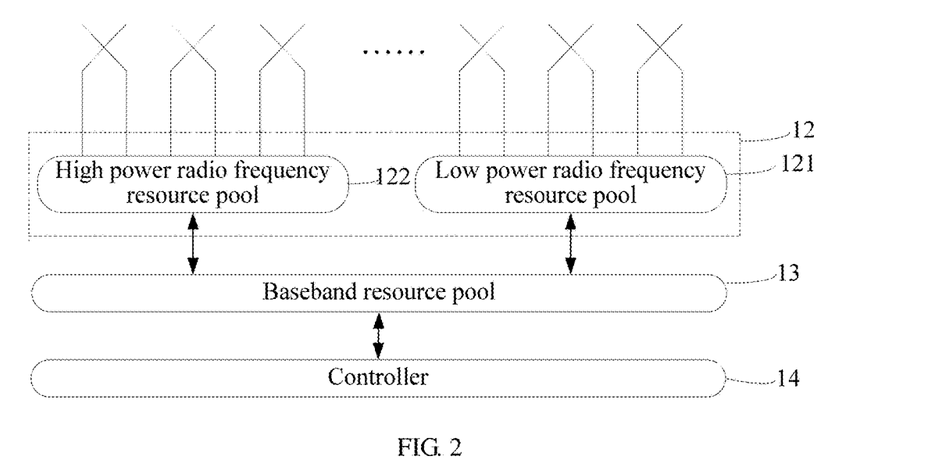
FIG. 2 is a schematic structural diagram of another distributed antenna system provided by an embodiment of the present invention.

Optionally, as shown in FIG. 2, the radio frequency resource pool 12 may include a low power radio frequency resource pool 121 and a high power radio frequency resource pool 122. One end of the low power radio frequency resource pool 121 and one end of the high power radio frequency resource pool 122 are respectively connected to the baseband resource pool 13, the other ends thereof are connected to corresponding antenna units, and the baseband resource pool 13 and the controller 14 are connected. The low power radio frequency resource pool 121 includes a low power radio frequency module, and the high power radio frequency resource pool 122 includes a high power radio frequency module. The high power radio frequency module is configured to cover the entire range of the macrocell, while the low power radio frequency module is configured to cover key areas. Generally, the power of a low power radio frequency module is smaller than 5 W, and the power of a high power radio frequency module is greater than 5 W.

Figure 3:
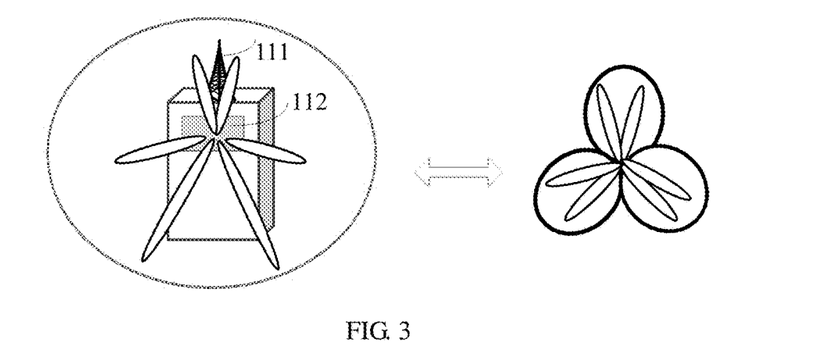
FIG. 3 is a schematic diagram of a coverage area of a distributed antenna system provided by an embodiment of the present invention.

Based on the foregoing antenna array system, the auxiliary antennas transmit segmented beams, so that according to the positions where the auxiliary antennas are distributed, the coverage effect of the entire macrocell can be different. The detailed process is specifically as follows:

As shown in FIG. 3, the macrocell antenna 111 covers the service range of the entire macrocell. Auxiliary antennas are distributed around the macrocell to cover some areas of the service area of the macrocell. Auxiliary antennas can coordinate with an adjacent antenna, so as to achieve the objective of strengthened coverage for key areas.

Figure 4:
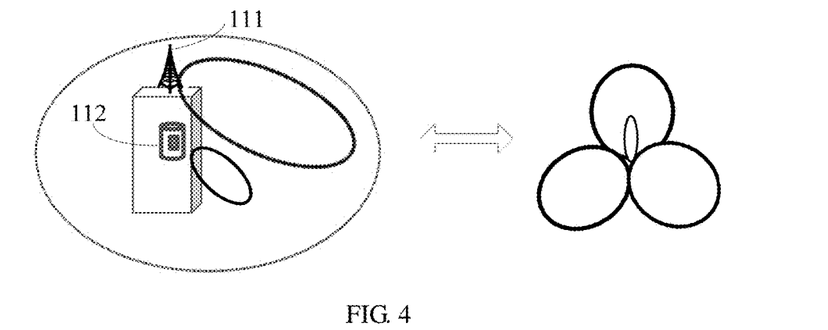
FIG. 4 is a schematic diagram of another coverage area of a distributed antenna system provided by an embodiment of the present invention.

As shown in FIG. 4, the macrocell antenna 111 covers the service range of the entire macrocell, while auxiliary antennas are antennas with a large electrical downtilt. The downtilt of the auxiliary antenna can be set between 20 degrees and 30 degrees to provide strengthened coverage in the vertical direction at the near site area of the macrocell antenna 111, so as to increase the network capacity. In comparison, the auxiliary antenna in FIG. 3 usually has a small downtilt (<20 degrees) and may cover the near site area and remote site area of a macrocell. FIG. 4 adopts a large electrical downtilt antenna for vertical coverage at the near site area, thereby guaranteeing the coverage in the vertical direction dimension.

Figure 5:
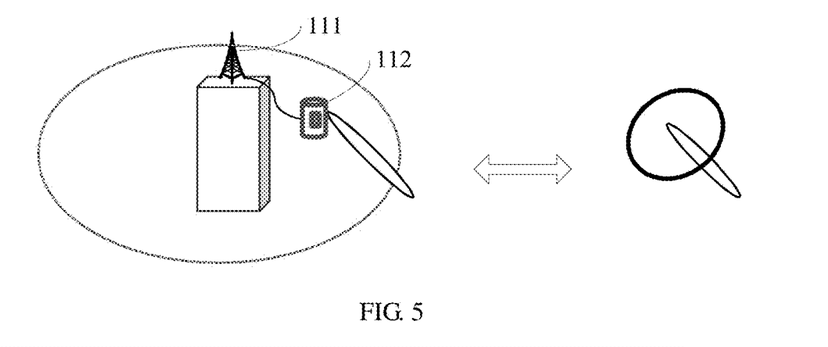
FIG. 5 is a schematic diagram of yet another coverage area of a distributed antenna system provided by an embodiment of the present invention.

As shown in FIG. 5, the macrocell antenna 111 covers the service range of the entire macrocell. Possibly because an area requiring strengthened coverage is far away from the macrocell, the auxiliary antenna can be remotely installed through optical fiber connection, so as to realize remote coverage for a key area at a relatively long distance. In this case, the controller 14 performs centralized control on the macrocell antenna 111 and the auxiliary antenna, and may control interference for an auxiliary antenna disposed at a position other than the positions allowing coordination with the macrocell antenna, thereby enhancing network performance.

In the foregoing distributed antenna array system, as auxiliary antennas are disposed at positions allowing coordination with an antenna unit under a coverage area of a macrocell, the auxiliary antennas are close to the macrocell, and large-scale optical fiber connection is not required, thereby lowering a deployment cost of a distributed antenna array system, at the same time, as the auxiliary antennas are disposed at the positions allowing coordination with the antenna unit under the coverage area of the macrocell, a user equipment within a range of the macrocell can obtain a coordinated transmission service of a plurality of antennas, thereby increasing signal quality and reducing interference, and further improving user experience and increasing network capacity.

Embodiment 2

An embodiment of the present invention provides a method for communication through a distributed antenna array system. The method is based on the distributed antenna array system provided in Embodiment 1. Specifically, as shown in FIG. 1, the antenna array system includes a plurality of antenna units, a radio frequency resource pool 12, a baseband resource pool 13, and a controller 14. The plurality of antenna units is connected to the radio frequency resource pool 12. The radio frequency resource pool 12 is further connected to the baseband resource pool 13. The baseband resource pool 13 is further connected to the controller 14. The plurality of antenna units is 111, 112A, 112B, and 112C, among which the antenna unit 111 is the macrocell antenna 111, and the antenna units 112A, 112B, and 112C are the auxiliary antennas.

The plurality of antenna units may be connected to the radio frequency resource pool 12 by adopting a feeder, respectively. Specifically, the auxiliary antenna can adopt a low profile antenna, specifically. For details, reference may be made to the antennas 112B and 112C shown in FIG. 1. Certainly, the auxiliary antenna specifically may also be a single or dual or multi polarized antenna. For details, reference may be made to the antenna 112A shown in FIG. 1.

As the auxiliary antenna adopted in the embodiment of the present invention may be a low profile antenna, for example, 112B and 112C, and the thickness of the antenna may be smaller than 40 mm. In this case, the profile thickness, volume, and weight of the antenna units 112B and 112C may be significantly reduced, which facilitates wall-mounting and concealed installation, making location selection easy at the time of planning an antenna position, and the antenna units may be directly fixed on a building according to an actual requirement, not requiring additional space, making the engineering implementation easy.

Further, the auxiliary antennas may further be antennas with a large electrical downtilt at the near site area and being array elements arranged at an unequal pitch, which are configured to guarantee the coverage in the vertical dimension and configured to implement coordination for the near site area of the macrocell antenna.

The macrocell antenna 111 is disposed on a macrocell, and the plurality of auxiliary antennas is distributed at positions allowing coordination with an antenna unit within a coverage area of the macrocell.

The plurality of auxiliary antennas is distributed at positions allowing coordination with an antenna unit under the coverage area of the macrocell, so that if a certain area under the coverage area of the macrocell requires strengthened coverage, coordinated transmission needs to be performed between the auxiliary antennas and the macrocell antenna 111. If the macrocell antenna 111 is far away from the auxiliary antenna, the time that a receiver of the macrocell antenna 111 receives a signal of a user equipment is obviously inconsistent with the time that a receiver of the auxiliary antenna receives a signal of the user equipment. This time difference causes that a delayed antenna signal has different phase rotation on each carrier in the frequency domain. Specifically, the phase rotation amount changes along with the carrier position. If the phase rotation amount is too large, an obvious error occurs on the channel estimation of the user equipment, causing that two antenna units fail to perform coordinated transmission normally.

Certainly, coordinated transmission may also be performed between two auxiliary antennas. As the macrocell antenna 111 is usually located at the center of a macrocell, when it is guaranteed that all auxiliary antennas can perform coordinated transmission with the macrocell antenna 111, the distance between any two auxiliary antennas also meets the requirement of coordinated transmission.

Specifically, the plurality of auxiliary antennas may be specifically distributed within 100 meters around the macrocell or at farther positions.

Figure 6:
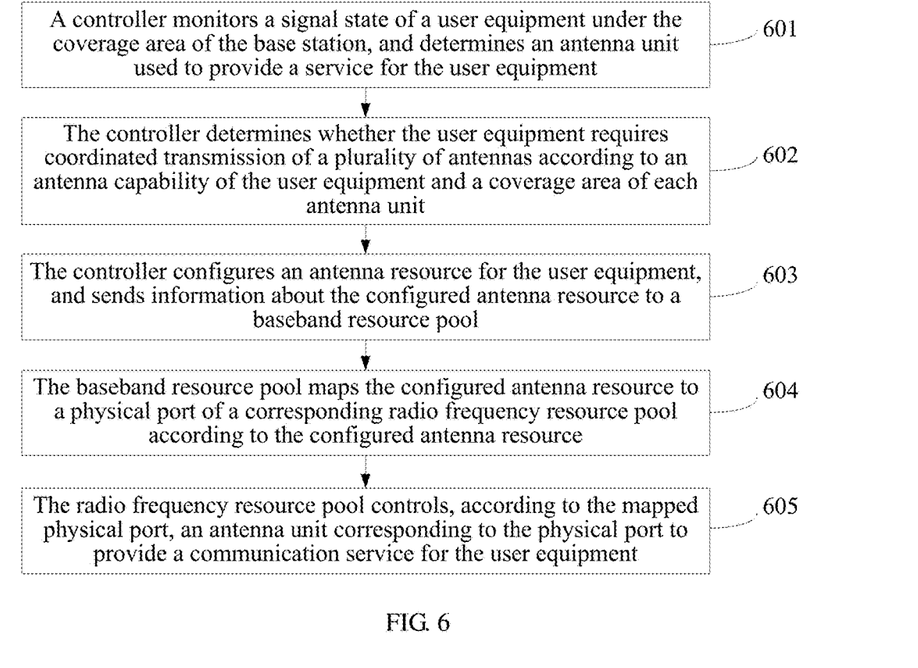
FIG. 6 is a schematic flow chart of a method for communication through a distributed antenna system provided by an embodiment of the present invention.

Specifically, as shown in FIG. 6, the method includes the following steps.

601. A controller determines, according to a signal state of a user equipment under the coverage area of the macrocell, an antenna unit used to provide a service for the user equipment.

That the controller 14 determines an antenna unit used to provide a service for the user equipment is specifically to determine a physical port or logical port of the antenna unit. The physical port and the logical port of an antenna unit may be different. According to a certain mapping rule, the controller may map a plurality of physical antenna ports into one or more logical transmission ports, and the process is transparent to a terminal.

Specifically, as shown in FIG. 1, as the plurality of auxiliary antennas is disposed at positions allowing coordination with an antenna unit within the coverage area of the macrocell, respectively, the controller 14 monitors a signal state of a user equipment UE1 under the coverage area of the macrocell. It is assumed that in a linear domain, a base station corresponding to the UE1 has a maximum signal processing capability of 4-antenna transmission, and each of the antenna unit 111 and antenna units 112A to 112C forms a pair of dual polarized antennas. It is assumed that the ascending order of path loss from the UE1 to the antenna units is: 112B, 112C, 112A, and 111. In this case, when the difference between the reciprocal of the path loss from the UE1 to the antenna unit 112B and the sum of the reciprocals of the path loss from the UE1 to the antenna units 112A, 112C, and 111 exceeds a first preset threshold value, it is determined that the antenna unit 112B provides a service to the UE1. As the UE1 has the signal processing capability of 4-antenna transmission, the controller 14 continues to determine accordingly whether the antenna unit 112C may also serve as a serving antenna unit of the UE1. If the controller 14 determines that the antenna unit 112C is a serving antenna unit of the UE1.

Optionally, in a linear domain, when determining an antenna unit used to provide a service for the user equipment, the controller 14 may further determine, according to receive power for the antenna unit to receive a signal sent by the user equipment, an antenna unit used to provide a service for the user equipment. Within the maximum range of the reception processing capability of the current UE, the receive power of the antenna units is ranked in descending order. If the ratio of the receive power of the antenna unit to the sum of receive power of other antenna units behind the antenna unit exceeds a second preset threshold value, the controller 14 determines that the antenna unit is an antenna unit used to provide a service for the user equipment.

Optionally, in a linear domain, when determining an antenna unit used to provide a service for the user equipment, the controller 14 may further determine, according to downlink receive power of the user equipment, an antenna unit used to provide a service for the user equipment. Within the maximum range of the reception processing capability of the current UE, downlink receive power for the user equipment to receive from a plurality of antenna units is ranked in descending order, if the ratio of downlink receive power for the user equipment to receive from the antenna unit to the sum of receive power for the user equipment to receive from other antenna units exceeds a third preset threshold value, the controller 14 determines that the antenna unit is an antenna unit used to provide a service for the user equipment.

Certainly, in a nonlinear domain, the controller 14 may also determine, according to the signal state of the user equipment, an antenna unit used to provide a service for the user equipment, and details are not repeatedly described in the embodiment of the present invention.

602. The controller determines, according to an antenna capability of the user equipment, whether the user equipment requires coordinated transmission of a plurality of antennas.

As the UE1 has the capability to receive signals transmitted by two auxiliary antennas, the controller 14 determines to perform coordinated transmission of 112B and 112 for the UE1, and at the same time determines a corresponding transmission mode.

603. The controller configures an antenna resource for the user equipment, and sends information about the configured antenna resource to a baseband resource pool.

When determining that the UE1 requires coordinated transmission, the controller 14 configures antenna resources of 112B and 112C for the UE1, and sends information about the configured antenna resources to the baseband resource pool 13. The information about the configured antenna resources includes information about physical ports of antennas 112B and 112C or logical ports of 112B and 112C and a transmission mode.

604. The baseband resource pool maps the configured antenna resource to a physical port of a corresponding radio frequency resource pool according to the configured antenna resource.

Then, the baseband resource pool 13 maps the logical ports of 112B and 112C to the physical ports of 112B and 112C according to the information about the configured antenna resources, that is, maps the logical ports to the physical ports corresponding to 112B and 112C in the radio frequency resource pool 12.

605. The radio frequency resource pool controls, according to the mapped physical port, an antenna unit corresponding to the physical port to provide a communication service for the user equipment.

Optionally, as shown in FIG. 2, the radio frequency resource pool 12 may include a low power radio frequency resource pool 121 and a high power radio frequency resource pool 122. One end of the low power radio frequency resource pool 121 and one end of the high power radio frequency resource pool 122 are respectively connected to the baseband resource pool 13, the other ends thereof are connected to corresponding antenna units, and the baseband resource pool 13 and the controller 14 are connected. The low power radio frequency resource pool 121 includes a low power radio frequency module, and the high power radio frequency resource pool 122 includes a high power radio frequency module. The high power radio frequency module is configured to cover the entire range of the macrocell, while the low power radio frequency module is configured to cover key areas. Generally, the power of a low power radio frequency module is smaller than 5 W, and the power of a high power radio frequency module is greater than 5 W.

In the foregoing distributed antenna array system, as auxiliary antennas are disposed at positions allowing coordination with an antenna unit under a coverage area of a macrocell, the auxiliary antennas are close to the macrocell, and large-scale optical fiber connection is not required, thereby lowering a deployment cost of a distributed antenna array system, at the same time, as the auxiliary antennas are disposed at the positions allowing coordination with the antenna unit under the coverage area of the macrocell, a user equipment within a range of the macrocell can obtain a coordinated transmission service of a plurality of antennas, thereby increasing signal quality and reducing interference, and further improving user experience and increasing network capacity.

A person of ordinary skill in the art may understand that, all or a part of the steps of the foregoing method embodiments may be implemented by a program instructing relevant hardware. The foregoing programs may be stored in a computer readable storage medium. When the program runs, the steps of the foregoing method embodiments are performed. The foregoing storage medium includes various mediums capable of storing program code, such as a ROM, a RAM, a magnetic disk, or an optical disc.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A distributed antenna array system, comprising:
   a controller;
   a baseband resource pool to the controller; and
   a radio frequency resource pool connected to the baseband resource pool; and
   a plurality of antenna units connected to the radio frequency resource pool, the plurality of antenna units comprising a macrocell antenna unit and a plurality of auxiliary antenna units, wherein the macrocell antenna unit is disposed on a macrocell and a range of the macrocell antenna unit is a coverage area of the macrocell, wherein each of the plurality of auxiliary antenna units transmits a segmented beam that covers only a part of the coverage area of the macrocell, wherein the plurality of auxiliary antenna units are positioned remotely from the macrocell antenna unit, and each other, and in a manner that a signal sent by a user equipment has a same amount of phase rotation of a carrier in a frequency domain when it is received by two of the plurality of antenna units, and wherein the signal has the same amount of phase rotation when an amount of phase rotation difference between the received signals is below a threshold, so that the two of the antenna units may perform coordinated transmission to the user equipment;
   wherein the controller is configured to:
      determine a first antenna unit of the plurality of antenna units used to provide a service for the user equipment according to a signal state of the user equipment under the coverage area of the macrocell;
      determine whether to perform coordinated transmission of multiple antenna units in the plurality of antenna units and a corresponding transmission mode for the user equipment according to a reception and transmission capability of the user equipment, and, when determining to perform coordinated transmission of multiple antenna units, determining a second antenna unit of the plurality of antenna units to provide the service for the user equipment, the first and the second antenna unit being positioned remotely from each other; and
      send information about an antenna resource configured for the user equipment to the baseband resource pool, so that the baseband resource pool and the radio frequency resource pool control the configured antenna resource to provide a communication service for the user equipment, wherein the configured antenna resource comprises the first antenna unit and the second antenna unit when the controller determines to perform coordinated transmission; and
   wherein the baseband resource pool and the radio frequency resource pool are configured to control a corresponding antenna unit according to the information about the configured antenna resource sent by the controller in order to provide a communication service for the user equipment.

2. The system according to claim 1, wherein an auxiliary antenna of the plurality of auxiliary antenna units is a low profile antenna.

3. The system according to claim 1, wherein an auxiliary antenna of the plurality of auxiliary antenna units is an antenna with a large electrical downtilt at a near site area.

4. The system according to claim 1, wherein an auxiliary antenna of the plurality of auxiliary antenna units is a single, dual or multi polarized antenna.

5. The system according to claim 1, wherein the signal state of the user equipment is path loss from the user equipment to an antenna unit covering the user equipment.

6. The system according to claim 1, wherein the signal state of the user equipment is downlink receive power of the user equipment.

7. The system according to claim 1, wherein the signal state of the user equipment is receive power for an antenna unit providing service to the user equipment to receive an uplink signal sent by the user equipment.

8. The system according to claim 1, wherein the radio frequency resource pool comprises a low power radio frequency resource pool and a high power radio frequency resource pool.

9. The system according to claim 8, wherein the auxiliary antenna units are disposed within 100 meters around the macrocell.

10. A method for communication through a distributed antenna array system, the method comprising:
    determining, by a controller and according to a signal state of a user equipment under a coverage area of a macrocell, a first antenna unit used to provide a service for the user equipment, wherein the controller determines the first antenna unit used to provide a service for the user equipment from among a plurality of antenna units, the plurality of antenna units comprising a macrocell antenna unit that has a range of the coverage area of the macrocell and a plurality of auxiliary antenna units, wherein each of the plurality of auxiliary antenna units are positioned remotely from the macrocell antenna unit, and each other, and each auxiliary antenna unit transmits a segmented beam that covers only a part of the coverage area of the macrocell, and wherein the plurality of auxiliary antenna units are positioned in a manner that a signal sent by the user equipment has a same amount of phase rotation of a carrier in a frequency domain when it is received by two of the plurality of antenna units, and wherein the signal has the same amount of phase rotation when an amount of phase rotation difference between the received signals is below a threshold, so that the two of the antenna units may perform coordinated transmission to the user equipment;

determining, by the controller and according to a reception and transmission capability of the user equipment, whether the user equipment requires coordinated transmission of multiple antenna units of the plurality of antenna units and a corresponding transmission mode;

configuring, by the controller, an antenna resource for the user equipment, wherein when the controller determines the user equipment requires coordinated transmission of multiple antenna units, the antenna resource comprises the first antenna unit and a second antenna unit of the plurality of antenna units, the first antenna unit being positioned remotely from the second antenna unit;

sending information about the configured antenna resource to a baseband resource pool;

mapping, by the baseband resource pool, the configured antenna resource to a physical port of a corresponding radio frequency resource pool according to the configured antenna resource; and controlling, by the radio frequency resource pool, according to the mapped physical port, an antenna unit corresponding to the physical port to provide a communication service for the user equipment.

11. The method according to claim 10, wherein an auxiliary antenna of the plurality of auxiliary antenna units is a low profile antenna.

12. The method according to claim 10, wherein an auxiliary antenna of the plurality of auxiliary antenna units is an antenna with a large electrical downtilt at a near site area.

13. The method according to claim 10, wherein an auxiliary antenna of the plurality of auxiliary antenna units is a single, dual or multi polarized antenna.

14. The method according to claim 10, wherein the signal state of the user equipment is path loss from the user equipment to an antenna unit covering the user equipment.

15. The method according to claim 10, wherein the signal state of the user equipment is downlink receive power of the user equipment.

16. The method according to claim 10, wherein the signal state of the user equipment is receive power for an antenna unit providing service to the user equipment to receive an uplink signal sent by the user equipment.

17. The method according to claim 10, wherein the radio frequency resource pool comprises a low power radio frequency resource pool and a high power radio frequency resource pool.

18. A method for communication through a distributed antenna array system, the method comprising:

determining, by a controller and according to a signal state of a user equipment under a coverage area of a macrocell, an antenna unit used to provide a service for the user equipment, wherein the controller determines the antenna unit used to provide a service for the user equipment among a plurality of antenna units, the plurality of antenna units including a macrocell antenna that has a range of the coverage area of the macrocell and a plurality of auxiliary antennas that each transmit a segmented beam that provides coverage to only a part of the coverage area of the macrocell, wherein the macrocell antenna is disposed on an upper surface of a building, and wherein each of the plurality of auxiliary antennas are disposed in areas of the building other than the upper surface of the building, and wherein the plurality of auxiliary antennas are positioned in a manner that a signal sent by the user equipment has a same amount of phase rotation of a carrier in a frequency domain when it is received by two of the plurality of antenna units, and wherein the signal has the same amount of phase rotation when an amount of phase rotation difference between the received signals is below a threshold, so that the two of the antenna units may perform coordinated transmission to the user equipment;

determining, by the controller and according to a reception and transmission capability of the user equipment, whether the user equipment requires coordinated transmission of a plurality of the antennas and a corresponding transmission mode;

configuring, by the controller, an antenna resource for the user equipment;

sending information about the configured antenna resource to a baseband resource pool;

mapping, by the baseband resource pool, the configured antenna resource to a physical port of a corresponding radio frequency resource pool according to the configured antenna resource; and controlling, by the radio frequency resource pool, according to the mapped physical port, an antenna unit corresponding to the physical port to provide a communication service for the user equipment.

19. The distributed antenna array system according to claim 1, wherein the threshold corresponds to a maximum amount of phase rotation that permits channel estimation of the user equipment to be performed with an acceptable error rate.

20. The method according to claim 18, wherein the threshold corresponds to a maximum amount of phase rotation that permits channel estimation of the user equipment to be performed with an acceptable error rate.

* * * * *